(12) United States Patent (10) Patent No.: US 8,317,417 B2
Viglione et al. (45) Date of Patent: Nov. 27, 2012

(54) SHUTTER DAMPING ASSEMBLY

(75) Inventors: David Viglione, Rochester, NY (US);
Helen Hong Yan, Victor, NY (US); John Thomas Jones, Walworth, NY (US)

(73) Assignee: VA, Inc., Rochester, NY (US)

( * ) Notice: Subject to any disclaimer, the term of this patent is extended or adjusted under 35 U.S.C. 154(b) by 0 days.

(21) Appl. No.: 12/711,385

(22) Filed: Feb. 24, 2010

(65) Prior Publication Data

US 2011/0206362 A1 Aug. 25, 2011

(51) Int. Cl.
*G03B 9/08* (2006.01)
(52) U.S. Cl. ....................................... 396/453
(58) Field of Classification Search ........... 396/453–456
See application file for complete search history.

(56) References Cited

U.S. PATENT DOCUMENTS

| | | | |
|---|---|---|---|
| 3,804,506 A | 4/1974 | Fletcher et al. | |
| 5,135,089 A | 8/1992 | Kovac | |
| 6,749,349 B2 * | 6/2004 | Tanaka | 396/454 |
| 7,513,701 B2 * | 4/2009 | Naganuma | 396/454 |
| 2004/0258405 A1 * | 12/2004 | Shiratori et al. | 396/458 |
| 2006/0120715 A1 * | 6/2006 | Pasquarella et al. | 396/453 |
| 2009/0232488 A1 | 9/2009 | Viglione | |

FOREIGN PATENT DOCUMENTS

| JP | 07-181559 | 7/1995 |
|---|---|---|
| JP | 08-062666 | 3/1996 |

OTHER PUBLICATIONS

Rogers Corporation: PORON® Cellular Urethane Foams, Publ. #17-034, Oct. 1999 (2 pages).
McLeod, et al.: Advanced electro-mechanical micro-shutters for thermal infrared night vision imaging and targeting systems (pp. 1-10).
Melles Griot Custom Shutters, www.mellesgriot.com. (pp. 1-2).
International Search Report and Written Opinion mailed Dec. 15, 2011 in corresponding International Application No. PCT/US2011/024955, filed Feb. 16, 2011 (11 pages).

* cited by examiner

*Primary Examiner* — Clayton E Laballe
*Assistant Examiner* — Dennis Hancock
(74) *Attorney, Agent, or Firm* — Finnegan, Henderson, Farabow, Garrett & Dunner LLP

(57) ABSTRACT

A rotary photographic shutter includes a base plate, a rotating ring, a plurality of shutter blades pivotally connected to the base plate, and moveable between an open position and a closed position in response to rotation of the ring, and an actuation assembly connected to the base plate, the actuation assembly includes a drive arm operable to selectively rotate the ring. The exemplary rotary photographic shutter also includes a bumper assembly comprising at least one resilient element fixedly disposed with respect to the base plate. The drive arm impinges the resilient element when the plurality of shutter blades is in the open and closed positions, and the drive arm is isolated from contact with the resilient element when the plurality of shutter blades is between the open and closed positions. The exemplary rotary photographic shutter also includes a damper fixedly disposed with respect to the base plate such that at least one shutter blade of the plurality of shutter blades impinges the damper at the open position and is isolated from contact with the damper at the closed position.

43 Claims, 6 Drawing Sheets

SHUTTER DAMPING ASSEMBLY

CROSS-REFERENCE TO RELATED APPLICATIONS

None.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates generally to dampers for lightweight mechanical assemblies and more particularly to a damper for a mechanical shutter such as a photographic shutter.

2. Description of Related Art

Mechanical assemblies having moving parts frequently require damping to protect the parts from damaging impacts and to increase the life and reliability of the assemblies. This is particularly true where the mechanical assembly is lightweight and the impact is repetitive and at a high rate of speed. Electrically operated lens shutters used in various types of photographic and laboratory equipment meet these criteria. For example, a shutter can open and close in a fraction of a second. Electronically operated shutters can operate at frequencies of 2 to 400 cycles per second and higher.

Lens shutters generally are of two types. In one type, a so called "guillotine" shutter has one or two thin, metal blades or leaves arranged to cover a lens opening. Pivot connections allow each blade to swing between a closed position where the blades cover the lens opening and an open position where the blades are drawn aside from the lens opening.

In a second type, a plurality of pivotally mounted blades, usually five or six, are arranged around the lens. Each blade is connected to a rotatable ring. In the operation of these rotary shutters, the rotation of the ring in one direction causes the blades to swing in unison to an open position. Counter rotation of the ring swings the blades to a closed position over the lens opening after exposure.

It is common in the first type of shutter to provide a shock absorber or damper that absorbs the impact as the blades are pivoted between the open and closed positions. In this respect, reference is made to U.S. Pat. Nos. 3,595,553 and 3,664,251, and U.S. Patent Publication No. 2006-0120715, the disclosures of which are incorporated herein by reference. As disclosed in these references, the shock absorber operates to stop the shutter blade very rapidly, yet softly without damage and with little or no bounce.

One material known to have damping characteristics suitable for use in the damping assembly of photographic shutters is an ISOLOSS® high density molded product made by Aearo Company. The ISOLOSS® products are high density damped polyurethane thermoset polymers. Sheets and molded parts of this material have been used in a variety of applications relating to noise, shock, and vibration reduction. The material has favorable hysteretic damping properties, good compliance and is able to absorb and store mechanical energy while effectively dissipating it in the form of heat.

Dampers made from this polyurethane molded material have been used for some time in combination with other materials such as metals and Teflon coated metal and have provided good results in some applications. However, one disadvantage of the polyurethane molded shock absorbing formulations is that they have a rubbery characteristic and tend to stick to the surfaces that they impact while performing the damping function. In an attempt to remedy this, the impact surface often is coated with Teflon. A Teflon coated surface can reduce or eliminate the sticking when contacting the polyurethane molded damper, however, the Teflon coated surface introduces other problems. Teflon tends to scale and form a powdery residue somewhat like talcum powder in its consistency. In many applications the residue is not harmful but, in some applications, such as optical shutters, the residue may find its way to the surfaces of optical components such as lenses. This powder on the surface of the lens is detrimental to the operation of the lens.

Nevertheless, even in photographic shutter systems employing damping assemblies similar to those described above, problems related to noise, vibration, blade inertia, mechanical contact, and other forces may hinder shutter performance. For example, shutter assemblies using larger shutter blades and/or high mass shutter blades may experience premature failure caused by the inertia of such blades. Although known damping assemblies may be utilized to damp the shutter components controlling movement of the shutter blades, some shutter components may still experience wear over time. For instance, the shutter blades may each define a slot, and a pin of the shutter assembly may be movably disposed in each slot to open and close the shutter blades. Over thousands of cycles, however, the pins and/or the slots may begin to wear. As a result of such wear and reduced tolerancing, the shutter blades may move beyond their ordinary path of travel, and in some circumstances, may even impact portions of the shutter assembly in the open and/or closed position. Such impact may cause damage to the shutter blades, and may degrade the performance and reliability of the photographic shutter.

Accordingly, it is an object of the present invention to provide an improved damping assembly for photographic shutters and in particular, high speed rotary shutters.

BRIEF SUMMARY OF THE INVENTION

In an exemplary embodiment of the present disclosure, a rotary photographic shutter includes a base plate, a rotating ring, a plurality of shutter blades pivotally connected to the base plate, and moveable between an open position and a closed position in response to rotation of the ring, and an actuation assembly connected to the base plate, the actuation assembly includes a drive arm operable to selectively rotate the ring. The exemplary rotary photographic shutter also includes a bumper assembly comprising at least one resilient element fixedly disposed with respect to the base plate. The drive arm impinges the resilient element when the plurality of shutter blades is in the open and closed positions, and the drive arm is isolated from contact with the resilient element when the plurality of shutter blades is between the open and closed positions. The exemplary rotary photographic shutter also includes a damper fixedly disposed with respect to the base plate such that at least one shutter blade of the plurality of shutter blades impinges the damper at the open position and is isolated from contact with the damper at the closed position.

In another exemplary embodiment of the present disclosure, a rotary photographic shutter includes a base plate, a rotating ring, a plurality of shutter blades pivotally connected to the base plate, and moveable between an open position and a closed position in response to rotation of the ring, and a drive arm pivotally connected to the base plate and operable to selectively rotate the ring. The exemplary rotary photographic shutter also includes a first impact damping assembly damping movement of the drive arm when the plurality of shutter blades is in the open and closed positions. The first impact damping assembly is isolated from contact with the drive arm when the plurality of shutter blades is between the open and closed positions. The exemplary rotary photographic shutter also includes a second impact damping assembly contacting at least one shutter blade of the plurality of shutter blades at the open position and is isolated from contact with the at least one shutter blade at the closed position.

In a further exemplary embodiment of the present disclosure, a rotary photographic shutter includes a base plate having a central aperture, a rotating ring, and a plurality of shutter blades connected to the ring and moveable between an open position exposing the aperture and a closed position blocking the aperture in response to rotation of the ring. The exemplary rotary photographic shutter also includes a first impact damping assembly supported by the base plate. The first impact damping assembly dampens the opening and closing of the plurality of shutter blades without contacting the plurality of shutter blades. The exemplary rotary photographic shutter also includes a second impact damping assembly contacting at least one shutter blade of the plurality of shutter blades at the open position and is isolated from contact with the at least one shutter blade at the closed position.

In an additional exemplary embodiment of the present disclosure, a rotary photographic shutter includes a plurality of shutter blades moveable between an open position and a closed position, and a first impact damping assembly operable to dampen opening and closing of the plurality of shutter blades, without contacting the plurality of shutter blades. The exemplary rotary photographic shutter also includes a second impact damping assembly contacting at least one shutter blade of the plurality of shutter blades at the open position and being isolated from contact with the at least one shutter blade at the closed position.

BRIEF DESCRIPTION OF THE SEVERAL VIEWS OF THE DRAWING(S)

Figure 9:
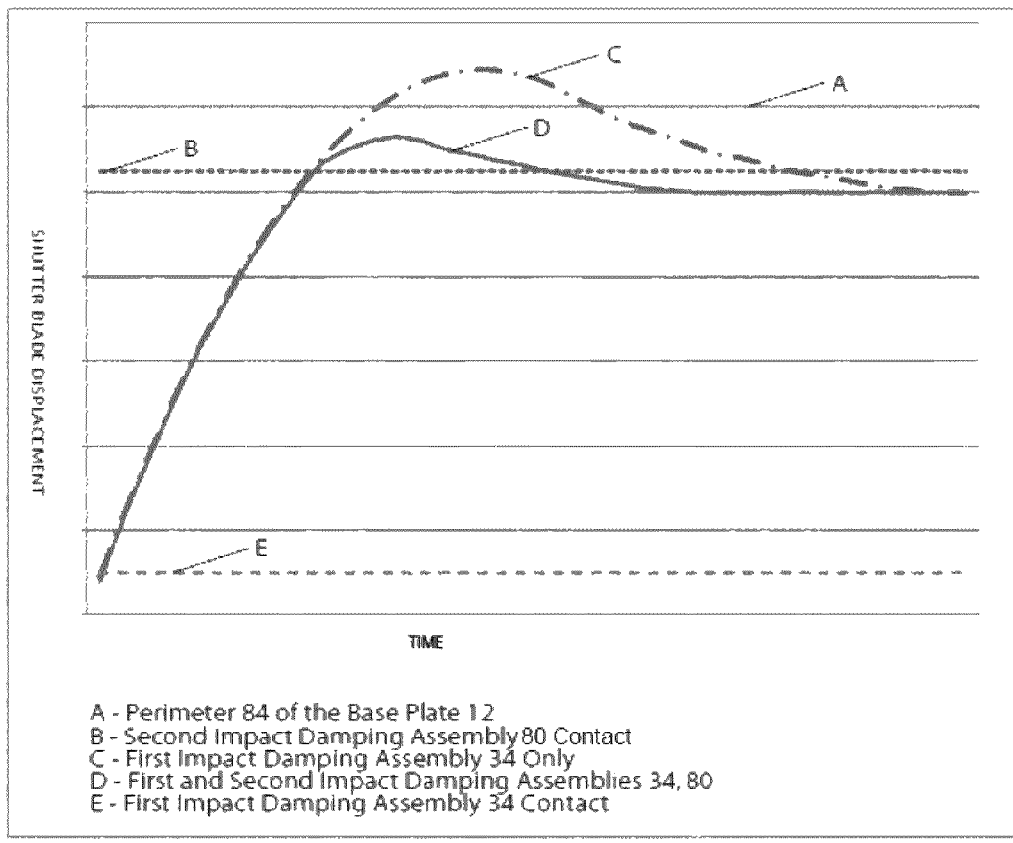

FIG. 9 graphically illustrates a relationship between shutter blade displacement and time according to an exemplary embodiment of the present disclosure.

DETAILED DESCRIPTION OF THE INVENTION

Figure 1:
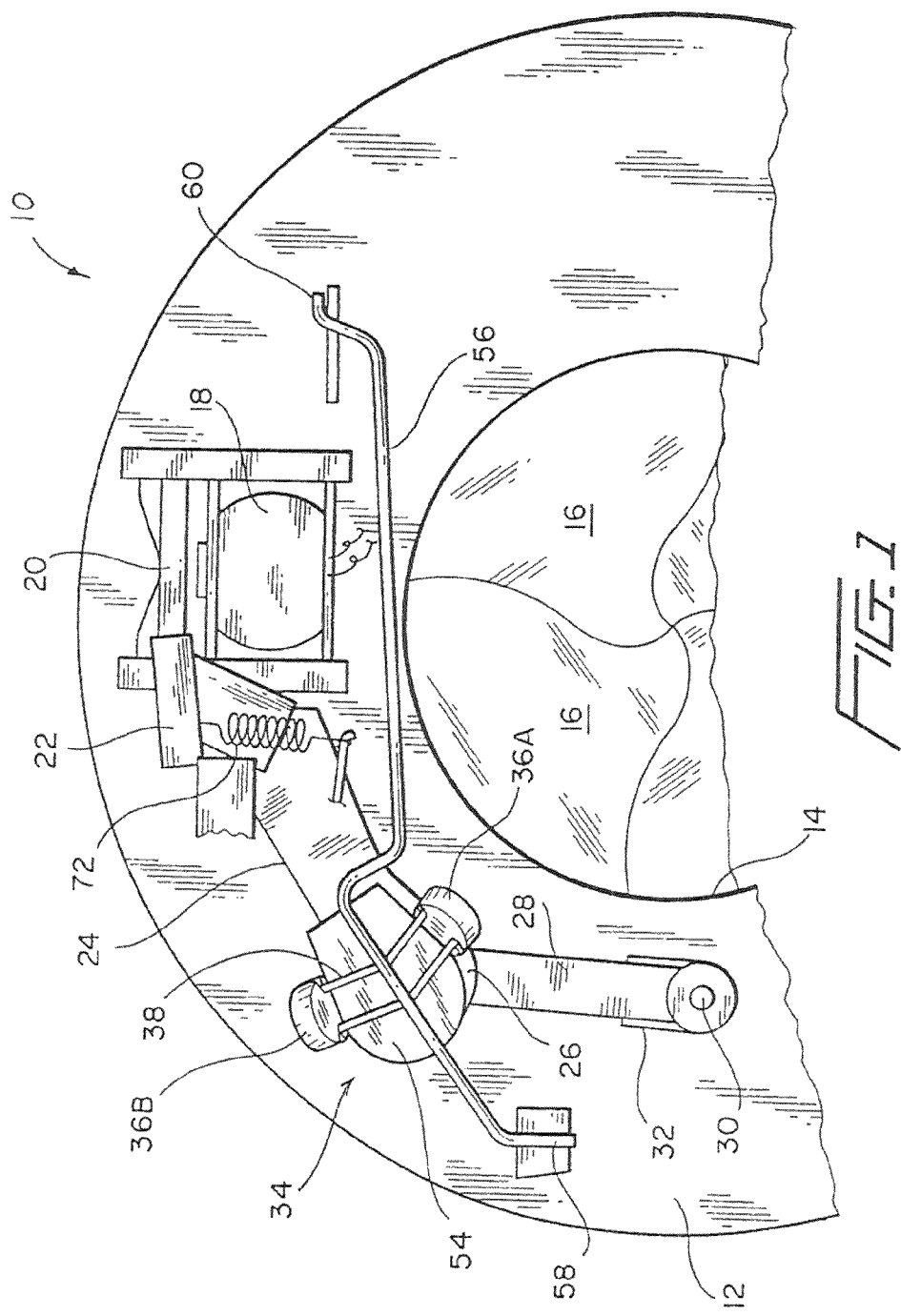
FIG. 1 is a front plan view of a shutter incorporating a damping assembly according to an exemplary embodiment of the present disclosure.

FIG. 1 shows a rotary shutter generally indicated at 10 incorporating an exemplary damping assembly. It should be appreciated that various components, brackets, and wiring harnesses of the shutter have been omitted for clarity. For purposes of orientation, the shutter 10 includes a base plate 12 having a central aperture 14. Supported at the underside (illustrated in FIGS. 7 and 8) of the base plate 12 are a plurality of shutter blades 16, portions of which are seen through the aperture 14. The rotary shutter 10 is conventional. The shutter blades 16 are operatively attached to a ring 72 (illustrated in FIGS. 7 and 8) that rotates with respect of the base plate. Rotation of the ring 72 in one direction moves the shutter blades 16 aside and opens the aperture 14. Reciprocal rotation of the ring 72 moves the shutter blades 16 back to the position shown in FIG. 1 wherein the aperture 14 is closed.

The means for operating the rotating ring 72 includes an electromagnetic actuator 18 mounted to the base plate. The actuator includes an armature 20 that engages a laterally extending rocker arm 22. The rocker arm engages a drive arm assembly connected to the base plate 12 and operable to selectively rotate the ring 72. The drive arm assembly may include any combination of linkages, arms, drivers, motors, or other components useful in imparting motion to rotating shutter components. In an exemplary embodiment, the drive arm assembly may include a drive arm 24 pivotally connected to the base plate 12. The drive arm is flat and formed of very thin sheet metal to minimize mass, and is pivotally supported so its end 26 moves in an arcuate path of travel. At its end 26, the drive arm is connected to a linkage 28. The linkage 28 has a connector 30 that extends through an elongated opening 32 in the base plate for connection to the ring 72. Thus, the linkage 28 may be coupled between the drive arm 24 and the ring 72, and may be operable to rotate the ring 72.

Figure 2:
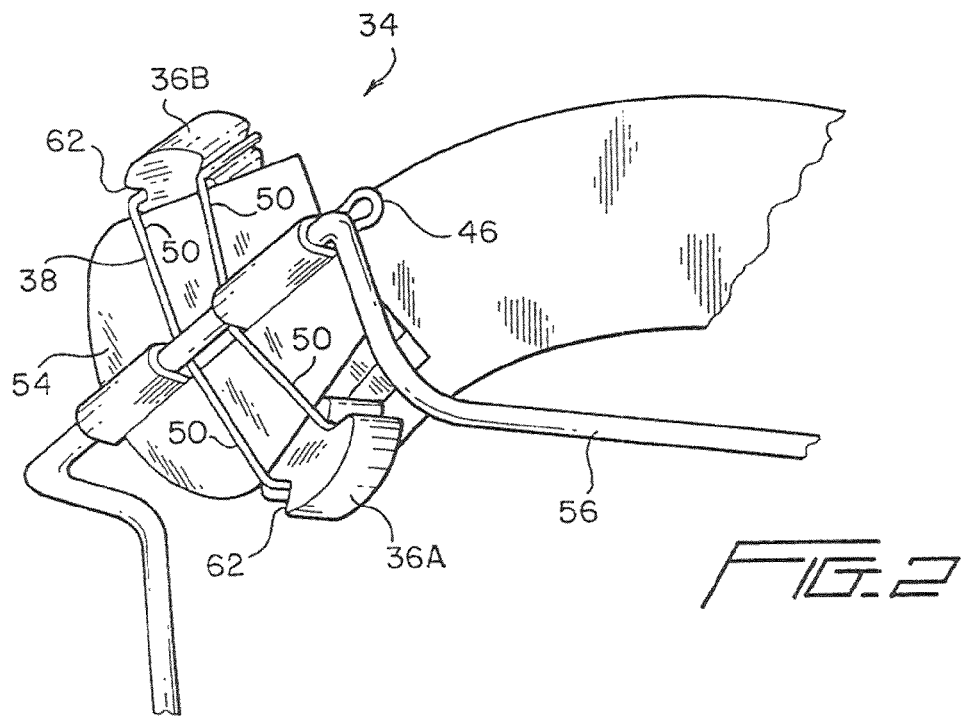
FIG. 2 is a perspective view on an enlarged scale of a portion of FIG. 1.
Figure 3:
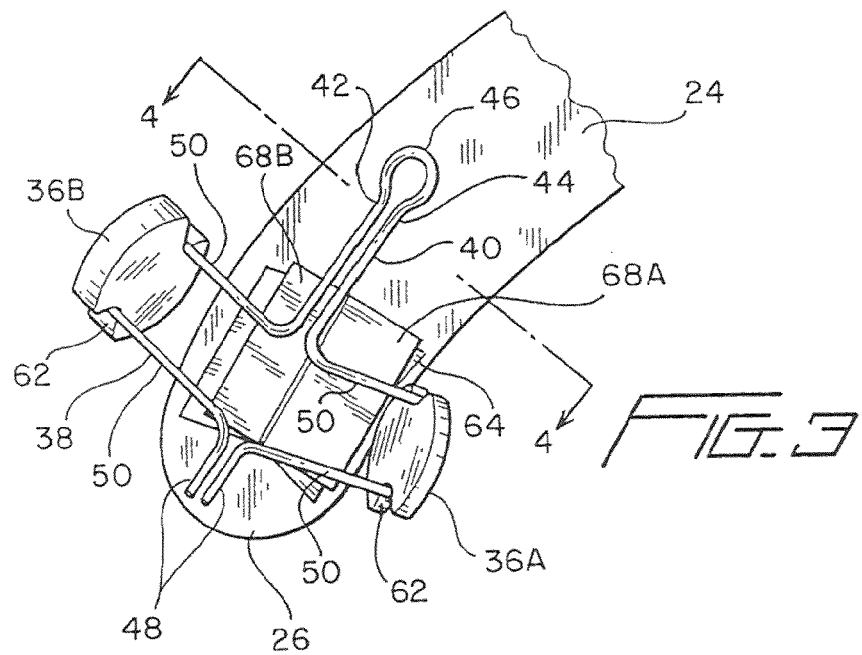
FIG. 3 is a plan view of the structure shown in FIG. 2 with portions removed for clarity.

The swinging movement of the drive arm 24 is damped by a damping assembly of the present disclosure generally indicated at 34. As best seen in FIGS. 2 and 3 the damping assembly includes a pair of bumpers 36 attached to a shaped spring wire 38. One of the bumpers is an inner bumper 36A and the other is an outer bumper 36B.

In an exemplary embodiment, the damping assembly 34 may be an impact assembly damping movement of the drive arm 24 when the plurality of shutter blades 16 is in the open and closed positions. In such an exemplary embodiment, the impact damping assembly may be isolated from contact with, for example, the drive arm 24 and/or other components of the drive arm assembly discussed above while the plurality of shutter blades is between the open and closed positions. On the other hand, one or more components of the drive arm assembly, such as the drive arm 24 and/or one or more resilient elements connected thereto, may impinge and/or otherwise contact the impact damping assembly when the plurality of shutter blades is in the open and closed positions.

As described herein, an "impact damping assembly" is an assembly including a resilient element imparting a damping force to a component that either impinges the resilient element or is impinged by the resilient element. As will be described in greater detail below, such a resilient element may be a substantially flexible element, such as a rubber, plastic or composite damper, or the like. Such exemplary impact damping assemblies, thus, are distinct from friction-based damping assemblies known in the art in which the damping elements remain in contact with the damped components. While most known mechanical assemblies contain components that contact one another, and relative movement of such components inherently results in frictional damping between such components, when used herein, the term "impact damping assembly" is understood to refer to an assembly imparting a damping force between two impinging components where the impinging components have at least one position in which they are isolated from contact with one another. In addition, while a damping force may be imparted when substantially any two components collide, the term "impact damping assembly" is understood to refer to an assembly including a resilient element providing a greater damping force at impact than typical non-resilient elements such as ceramics, metals, alloys, or the like. Accordingly, the damping assembly 34 shown in FIGS. 2 and 3 may be an impact damping assembly.

Moreover, the pair of bumpers 36 may comprise a bumper assembly, wherein the bumpers 36a, 36b comprise resilient elements fixedly disposed with respect to the base plate 12. In such an exemplary embodiment, at least one component of the drive arm assembly discussed above may impinge the bumper assembly when the plurality of shutter blades 16 is in the open and closed positions. The drive arm assembly may be, however, isolated from contact with the bumper assembly when the plurality of shutter blades 16 is between the open and closed positions.

Figure 4:
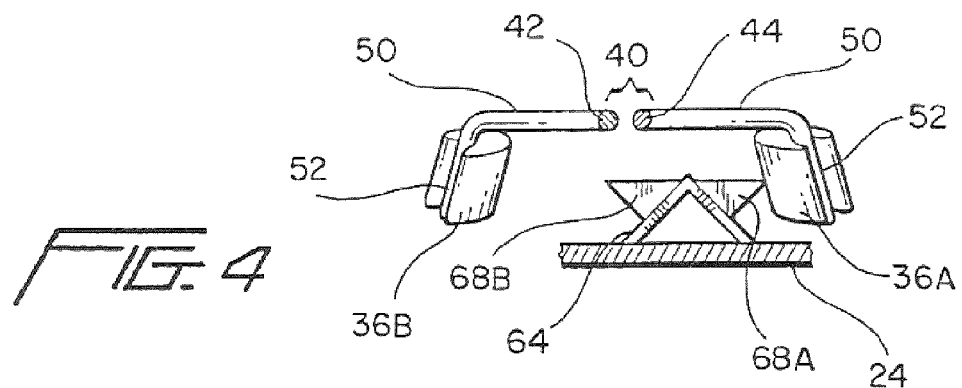
FIG. 4 is a view taken generally along lines 4-4 of FIG. 3.
Figure 5:
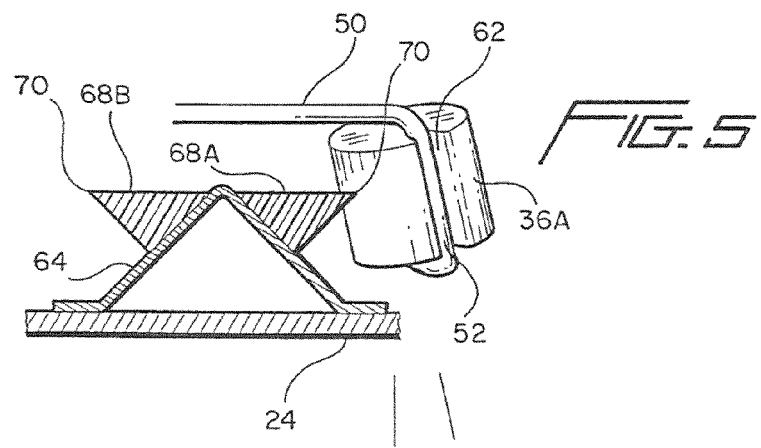
FIG. 5 is a view on an enlarged scale of a portion of FIG. 4 showing the disposition of components with the shutter in a closed position.

The spring wire that supports the bumpers preferably is formed of piano wire about 0.020 inches in diameter and is shaped to form a torsion spring. In this respect the spring wire is formed with a central spine 40 that is bifurcated (FIG. 3). The two portions 42, 44 of the bifurcated spine 40 are joined at one end 46 and are spaced apart and unjoined at an opposite end 48. Each of the two portions 42, 44 in turn is bent to form opposed, generally U-shaped arms 50 extending outward from the central spine 40. As best seen in FIGS. 4 and 5, the opposite ends 52 of the U-shaped arms are each bent downward from the plane of the central spine 40 and support the bumpers below the plane of the central spine 40.

As formed, the arms 50 of the spring wire are bent downwardly from the plane of the central spine 40. However, as shown in FIGS. 1 and 2, the spring wire 38 is carried by a stop plate 54 that is disposed beneath the arms and engages the arms to force them to assume an orientation that is closer to the plane of the spine. This pre-loads the arms 50 to provide a bias urging the arms to pivot downwardly from the plane of the central spine 40.

The stop plate in turn is rigidly fixed to a relatively heavy and rigid support wire 56. The support wire 56, with a diameter of 0.050 inches, is over twice the diameter of the spring wire 38. The ends 58, 60 of the support wire are fixed as rigidly as possible to the base plate 12 (FIG. 1) so as to minimize as much as possible the flexure of the support wire.

Figure 6:
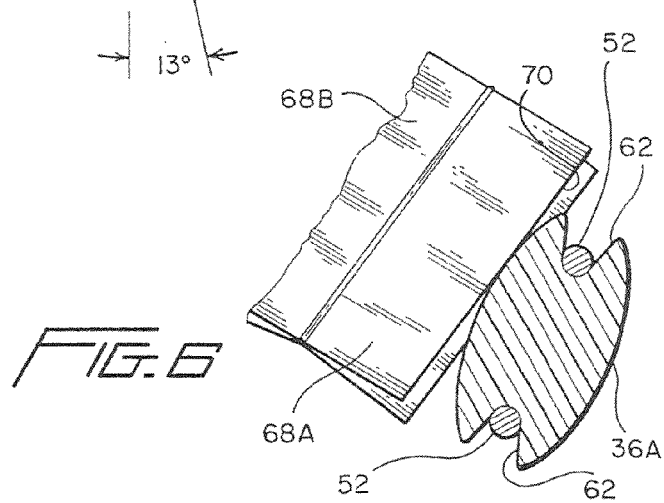
FIG. 6 is a view on an enlarged scale of a portion of FIG. 3.

As best seen in FIGS. 2, 3, and 6, each bumper 36 is generally oval in shape. The ends of the oval shape are each provided with a groove 62. These grooves receive the end 52 of the U-shaped arms for attaching the bumpers to the spring wire 38.

The impact damping assembly 34 is further shown in FIGS. 3, 4 and 5 to include components carried by the drive arm 24, which interact with the bumpers 36 and the spring wire 38. These components include a beam 64 that is fixed to a surface of the flat drive arm adjacent its end 26. The beam is generally triangular in cross section and the two upstanding sides or legs of the triangular beam extend upwardly from the drive arm and into the space between the downwardly bent ends 52 of the spring wire. Fixed to and extending outward from each of the upstanding legs is a resilient element or damper 68. In an exemplary embodiment, one of the dampers is an inner damper 68A and the other is an outer damper 68B. Each damper is generally triangular in cross section and is fixed to the beam such that a longitudinally extending corner 70 of each damper is disposed to contact one of the bumpers 36 (FIGS. 5 and 6).

In a start position with the shutter closed, the corner 70 of the inner damper 68A is in contact with the inner bumper 36A (FIGS. 4 and 6). To operate the shutter, the electromagnet 18 is energized and the armature 20, operating through the rocker arm 22, pivots the drive arm 24 so its end 26 is swung upwardly as viewed in FIG. 1. This pulls the connecting link 28 and rotates the ring 72 (FIGS. 7 and 8) to open the shutter. Pivoting the drive arm carries the outer damper 68B forward and into contact with the outer bumper 36B wherein the engagement of one against the other arrests the motion of the drive arm. When the electromagnet is de-energized, a spring 72 returns the drive arm back to the start position to close the shutter. The return motion of the drive arm then is arrested by the engagement of the inner damper 68A against the inner bumper 36A.

In a shutter having an aperture of 45 mm the operating speed of the shutter can be up to 5 Hertz and the speed increases as the aperture size decreases. Operating speeds of up to 400 hertz or more are possible in shutters having an aperture of 2 mm. Accordingly, it is important to arrest the forward and reverse motion of the drive arm quickly, smoothly and with little or no bounce. Several aspects contribute to the successful operation of the impact damping assembly 34 of the present invention. For example, one of the damper and bumper is formed of a highly damped polyurethane thermosetting resin that provides high performance damping, isolation, and shock and motion control with a loss factor in excess of 1.0. A preferred material is a urethane solid having the following properties:

Normal Hardness (ASTM D2240) Shore A Durometer Impact at 73° F. (23° C.) of about 58,
  Glass transition temperature (ASTM D575) of about 18° F. (−8° C.),
  Maximum loss factor at 10 Hz and 54° F. (12° C.) of about 0.94,
  Rebound (ASTM D2632) Bashore Resilience
    Rebound, 1st impact @ 20° C. of about 4.5%
    Rebound, 2nd impact @ 20° C. of about 0.0%,
  Compression Load Deflection (ASTM D575)
  10% Deflection about 82 psi (565 kPa)
    20% Deflection about 180 psi (1241 kPa)
    30% Deflection about 305 psi (2103 kPa)
    Compression Modulus about 845 psi (5826 kPa).
  A suitable material is ISOLOSS® HD made by Aearo Company.

The other of the damper and bumper is formed of an ultra high molecular weight polyethylene (UHMWPE) having a molecular weight in the range of 3 to 6 million. Such a material typically has a density of at least 0.930 g/cm$^3$ and up to 0.965 g/cm$^3$. Surprisingly, such a high molecular weight polyethylene provides effective damping when used together with the polyurethane despite the hardness of the polyethylene, which is considered a detriment to effective damping.

In a preferred arrangement the bumper is made of the UHMWPE whereas the damper is formed of the polyurethane. The polyethylene is extrudable to a desired shape of the bumper, as described hereinbelow, whereas the urethane material is not extrudable and must be molded to shape. Also, the urethane is readily attachable to the beam with an adhesive whereas an adhesive attachment of the polyethylene to the beam does not hold up over time and under the stress of repeated impacts.

The present invention also has the components of the impact damping assembly 34 arranged to provide substantially point contact between bumper 36 and the damper 70 during the entire time interval of contact between the two. This is accomplished by providing the bumper with an oval shape as shown and the damper with a longitudinally extending corner 70. The arrangement of the straight corner 70 of the damper striking against the curved surface of the oval bumper (FIG. 6) maintains substantially point contact for the duration of the contact time. Limiting the engagement to substantially point contact improves the efficiency of the impact damping assembly 34.

A further contribution to the impact absorbing characteristics of the impact damping assembly 34 results from the loading of the arms 50. As described above, the arms are loaded so they are biased in a downward direction. Accordingly an impact of a damper 68 against a bumper 36 that tends to rotate the arm 50 upwardly about the central spine is resisted by the downward bias of the arm. Furthermore, as shown in FIG. 5, each end 52 of the U-shaped arm 50 is bent downward at an angle of about 77° or within about 13° of a line perpendicular to the plane of the arm 50. This allows the impact of the damper to be partly absorbed by both an upward flexing in unison of the arm 50 and of the bifurcate central spine 40 of the spring wire. The angle is maintained to insure that the corner 70 of the damper strikes the approximate center of the bumper 36A so the two do not disengage as the bumper deflects upwardly against the resistance offered by the urging of the downward bias of the arm. The angle also prevents the adhesion of the two materials during the contact compression phase when the beam is moved causing the damper corner to impact the bumper.

While all the components as described cooperate to provide an effective impact damping assembly 34, it was found that forming the damper and bumper of polyurethane and high molecular weight polyethylene respectively contributed significantly to the effectiveness of the damper. In particular, these materials served to increase the operational life of the shutter by six times from one to six million operations while virtually eliminating the adhesion of the damper and bumper materials without the use of either anti-stick materials such as Teflon or lubricants.

Figure 7:
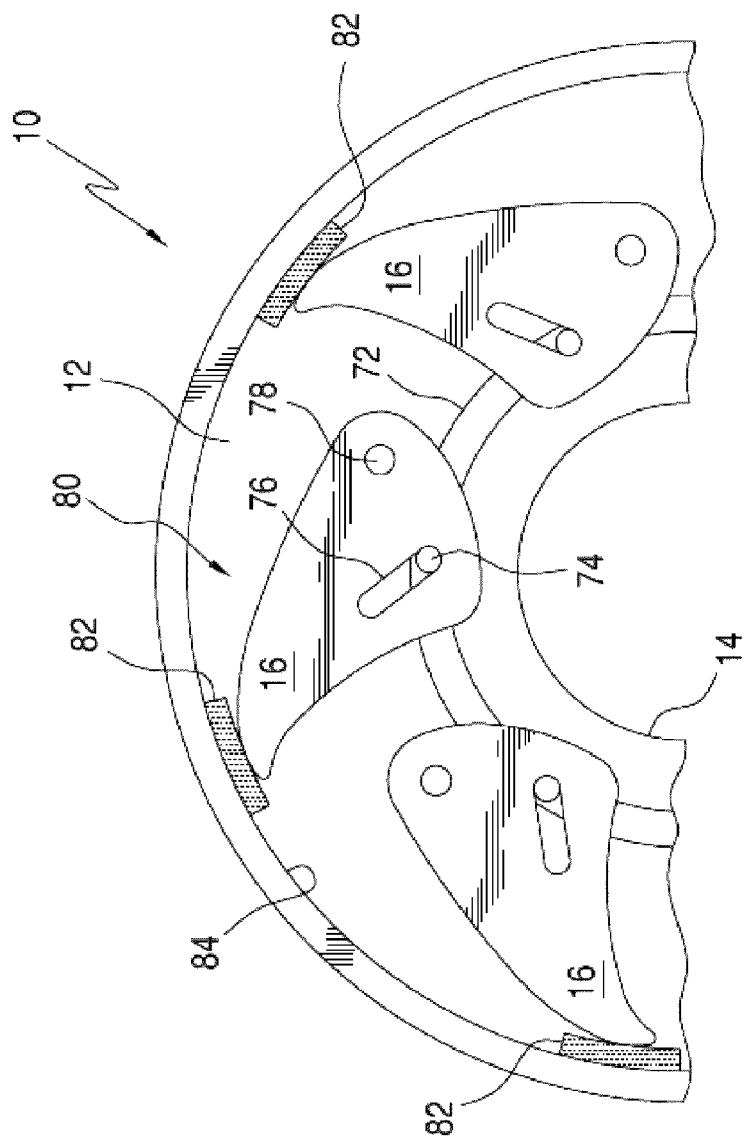
FIG. 7 is a rear plan view of the shutter illustrated in FIG. 1.
Figure 8:
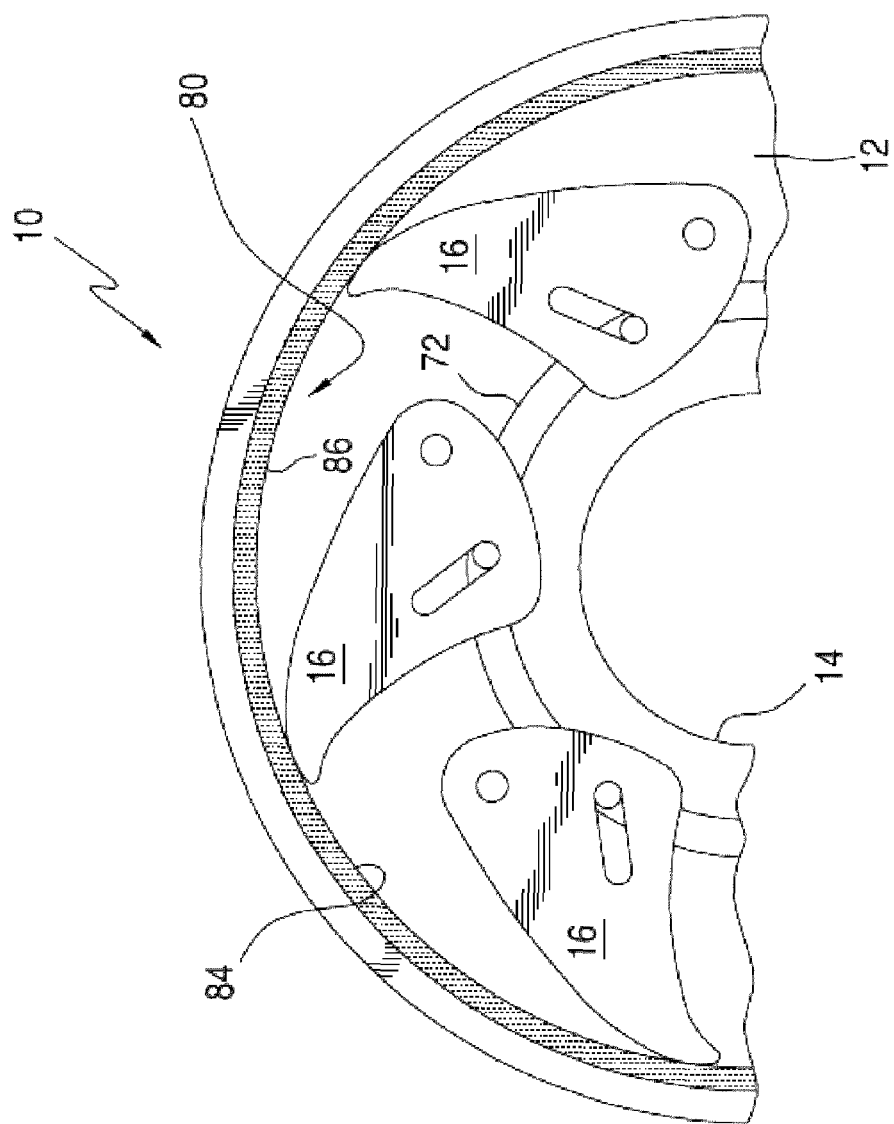
FIG. 8 is a rear plan view of the shutter illustrated in FIG. 1 according to another exemplary embodiment of the present disclosure.

While FIGS. 1-6 illustrate a first impact damping assembly 34 disposed on the base plate 12, in an exemplary embodiment, the rotary photographic shutter 10 may also include a second impact damping assembly 80 configured to damp movement of one or more components of the shutter 10. For example, as shown in FIGS. 7 and 8, in an exemplary embodiment, a second impact damping assembly 80 of the present disclosure may be configured to damp movement of one or more of the shutter blades 16, the drive ring 72, and/or other components of the shutter 10. In an exemplary embodiment, the second damping assembly 80 may be an impact damping assembly imparting a damping force to one or more components of the shutter 10 via intermittent contact therewith. For example, at least one shutter blade 16 of the plurality of shutter blades may come into contact with the impact damping assembly 80 at the open position shown in FIGS. 7 and 8. The impact damping assembly 80 may be, however, isolated from contact with the at least one shutter blade 16 when the shutter blades 16 are at the closed position as shown in FIG. 1.

In an exemplary embodiment, the impact damping assembly 80 may include at least one resilient element fixedly disposed with respect to the base plate 12. As shown in FIG. 7, the resilient element may be, for example, a damper 82 disposed on the base plate 12 such that at least one shutter blade 16 of the plurality of shutter blades impinges the damper 82 at the open position. It is understood, that the at least one shutter blade 16 may be isolated from contact with the damper 82 at the closed position. The impact damping assembly 80 may comprise a plurality of separate resilient elements such as the illustrated dampers 82, and the assembly 80 may include a separate damper 82 corresponding to each shutter blade 16 of the shutter 10. In such an exemplary embodiment, each damper 82 may prohibit a respective shutter blade 16 from impacting, for example, the base plate 12 and/or other components of the shutter 10 when the shutter blades 16 are in the open position. The dampers 82 may also prohibit a respective shutter blade 16 from traveling, for example, beyond a perimeter of the base plate 12 in the open position. The dampers 82 may be disposed proximate a perimeter 84 of the base plate 12 and/or at other locations on the base plate 12 to damp movement of the shutter blades 16 caused by their own inertia and/or to assist in prohibiting such freedom of travel.

In an exemplary embodiment, the first impact damping assembly 34 may slow the velocity of each shutter blade 16 by between approximately 60% and approximately 70% of its respective steady state or peak velocity by the time each shutter blade 16 reaches and/or impacts its corresponding damper 82. In an exemplary embodiment in which only the first impact damping assembly 34 is present and in which the second impact damping assembly 80 has been omitted, each of the shutter blades 16 may travel an additional distance beyond their desired range after rotation of the drive ring 72 has ceased. Such unwanted travel may result from the momentum of the shutter blades 16 and the tolerancing between, for example, the pins 74 and slots 76 discussed in greater detail below. In such an embodiment, the shutter blades 16 may continue to travel until one or more components of the first impact damping assembly 34 impart enough of a counter force to stop such movement. In fact, in an exemplary embodiment, such travel may result in the shutter blades 16 passing beyond the outer perimeter 84 of the base plate 12, and one or more of the shutter blades 16 may collide with, for example, camera components or other objects surrounding the shutter 10.

To minimize and/or eliminate this unwanted travel and the resulting damage to shutter components that such travel may cause, the second impact damping assembly 80 may provide additional damping force to each of the shutter blades 16 so as to arrest the motion of each shutter blade 16 prior to the blade 16 traveling beyond its desired range of motion. The total mass of the shutter blades 16 may amount to approximately 5% of the total mass of the shutter 10. While the first impact damping assembly 34 may slow the majority of the mass of the shutter blades 16 and/or other moving components of the shutter 10, in an exemplary embodiment, the second impact damping assembly 80 may be configured to damp and/or otherwise absorb, for example, the inertial force of each individual shutter blade 16. Accordingly, using the second impact damping assembly 80 in addition to the first impact damping assembly 34 may reduce the length of time necessary for the shutter blades 16 to reach a resting equilibrium in the open position. Such use may also reduce the length of time and the amount of vibration existing in the shutter 10. These exemplary results are illustrated in FIG. 9.

FIG. 9 graphically illustrates the displacement of shutter blades 16 after initial impact with the first impact damping assembly 34 (illustrated by line E). As shown in FIG. 9, the shutter blade 16 will travel beyond the perimeter 84 of the base plate 12 (Illustrated by line A) in an exemplary embodiment (C) having only the first impact damping assembly 34. However, in an exemplary embodiment (D) including both the first and second impact damping assemblies 34, 80, the second impact damping assembly 80 may absorb and/or otherwise damp inertial energy and motion of the shutter blade 16 upon contact therewith (illustrated by line B). Such damping may stop the shutter blade 16 from traveling beyond the perimeter 84 (line A) and may assist the blade 16 in reaching equilibrium more quickly in the open position. Although not illustrated in FIG. 9, it is understood that relatively small oscillations and/or vibrations of the shutter blades 16 may occur before such final equilibrium has been reached.

The dampers 82 may comprise any of the materials discussed above with respect to, for example, the bumpers 36 and/or damper 70 of the first impact damping assembly 34. In an exemplary embodiment, at least one of the dampers 82 may comprise a pad, and each pad may consist of a foam material such as, for example, PORON®. Such foam materials may be, for example, low density cellular urethane foams having high internal strength and high-dimensional stability.

In an alternative exemplary embodiment illustrated in FIG. 8, the second impact damping assembly 80 may comprise a resilient ring disposed proximate a perimeter of the base plate 12. In such an exemplary embodiment, the ring 86 may be made of any of the materials discussed above with regard to the damper 82. For example, the ring 86 may be a foam ring configured to contact at least one shutter blade 16 of the plurality of shutter blades at the open position. In addition, the ring 86 may be isolated from contact with the at least one shutter blade 16 at the closed position.

As shown in FIG. 7, and as discussed above, each shutter blade 16 may be pivotally connected to the base plate 12 and moveable between the open position and the closed position in response to rotation of the ring 72. In an exemplary embodiment, the shutter blades 16 may be pinned to the base plate 12 via one or more pins 78. Each shutter blade 16 may pivot about its respective pin 78 to achieve the open and closed positions. Each shutter blade 16 may also be connected to the ring 72 via one or more pins 74 connected to the ring 72. In an exemplary embodiment, each pin 74 may ride within a slot 76 defined by the shutter blade 16 to transition the shutter blades 16 between the open and closed positions through rotation of the ring 72. In such a configuration, damping movement of, for example, the drive arm 24 and/or the drive ring 72 may damp movement of the shutter blades 16 without actually contacting the shutter blades 16.

Based on the tolerancing, dimensions, position, and/or other configurations of the slot 76, pin 74, and pin 78, movement of each shutter blade 16 may be accurately controlled and unwanted variations in the travel of the shutter blades 16 can be avoided. However, over time one or more of the slot 76, pin 74, and pin 78 may begin to show signs of wear. Such wear may enable the shutter blades 16 to continue moving due to their own inertia even after the ring 72 has stopped rotating. This unwanted variation in shutter blade travel could result in the shutter blades 16 traveling beyond an outer perimeter 84 of the base plate 12, and may even result in contact between the shutter blades 16 and other components of the shutter 10.

For example, over time the slot 76 defined by the shutter blade 16 may become elongated and/or otherwise deformed thereby allowing an over rotation of the shutter blade 16 due to inertia of the shutter blade, even though motion of the drive arm 24 and/or the ring 72 has already ceased. The inertia of the shutter blade 16 may cause the shutter blade 16 to continue to pivot about the pin 78 and to impact, for example, a casing within which the base plate 12 is disposed. Repeated contact of the shutter blade 16 with the casing may damage the shutter blade 16 and may degrade the performance of the shutter 10. In another exemplary embodiment, the shutter blade 16 may even come into contact with an adjacent pin 74, 78.

To overcome this problem and to prohibit unwanted travel and/or contact of the shutter blades 16, the additional impact damping assembly 80 discussed above may be employed in the shutter 10. In such an exemplary embodiment, the impact damping assembly 80 may be configured to damp motion of one or more of the shutter blades 16 caused by shutter blade inertia, whereas the actual motion of the shutter blades 16, the rotating ring 72, and/or the drive arm 24 may be damped by the first impact damping assembly 34 discussed above with respect to FIGS. 1-6. Thus, in an exemplary embodiment, the first impact damping assembly 34 may provide a first damping force to a component of the drive arm assembly coming into contact with the first damping assembly 34 when the shutter blades 16 reach the open position. For example, the damping assembly 34 may impart a first damping force to the drive arm 24, or a resilient element connected to the drive arm 24, such as the damper 70. The second impact damping assembly 80, on the other hand, may provide a second damping force to at least one of the shutter blades 16, and the second damping force provided by the second impact damping assembly 84 may be less than the first damping force provided by the damping assembly 34.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

The invention claimed is:

1. A rotary photographic shutter, comprising:
   (a) a base plate;
   (b) a rotating ring;
   (c) a plurality of shutter blades pivotally connected to the base plate, and moveable between an open position and a closed position in response to rotation of the ring;
   (d) an actuation assembly connected to the base plate, the actuation assembly comprising a drive arm operable to selectively rotate the ring;
   (e) a bumper assembly comprising at least one resilient element fixedly disposed with respect to the base plate, the drive arm impinging the resilient element when the plurality of shutter blades is in the open and closed positions, the drive arm being isolated from contact with the resilient element when the plurality of shutter blades is between the open and closed positions; and
   (f) a damper fixedly disposed within and proximate to a perimeter of the base plate such that at least one shutter blade of the plurality of shutter blades impinges the damper at the open position and is isolated from contact with the damper at the closed position, the damper prohibiting the at least one shutter blade from impacting the base plate at the open position.

2. The rotary photographic shutter of claim 1, wherein the bumper assembly comprises an outer bumper and an inner bumper.

3. The rotary photographic shutter of claim 1, wherein the drive arm is pivotally connected to the base plate, the drive arm comprising an additional resilient element connected thereto.

4. The rotary photographic shutter of claim 3, wherein the additional resilient element connected to the drive arm is moveable with the drive arm in an arcuate path between an outer bumper and an inner bumper of the bumper assembly.

5. The rotary photographic shutter of claim 3, further comprising a linkage coupled between the drive arm and the ring, the linkage being operable to rotate the ring in response to movement of the drive arm.

6. The rotary photographic shutter of claim 1, wherein the damper comprises a separate resilient element corresponding to each shutter blade of the plurality of shutter blades, each resilient element of the damper prohibiting a respective shutter blade of the plurality of shutter blades from traveling beyond the perimeter of the base plate in the open position.

7. The rotary photographic shutter of claim 6, wherein each resilient element comprises a foam pad.

8. The rotary photographic shutter of claim 1, wherein the damper prohibits the plurality of shutter blades from traveling beyond the perimeter of the base plate in the open position.

9. The rotary photographic shutter of claim 1, wherein the damper comprises a foam ring disposed proximate the perimeter of the base plate.

10. The rotary photographic shutter of claim 1, wherein the at least one shutter blade impinges a side of the open position, and wherein the side extends substantially concentric with the perimeter of the base plate.

11. The rotary photographic shutter of claim 1, wherein the at least one shutter blade impinges a side of the damper at the open position, and wherein the side extends substantially concentric with a central aperture of the base plate.

12. A rotary photographic shutter, comprising:
(a) a base plate;
(b) a rotating ring;
(c) a plurality of shutter blades pivotally connected to the base plate, and moveable between an open position and a closed position in response to rotation of the ring;
(d) a drive arm pivotally connected to the base plate and operable to selectively rotate the ring;
(e) a first impact damping assembly damping movement of the drive arm when the plurality of shutter blades is in the open and closed positions, the first impact damping assembly being isolated from contact with the drive arm when the plurality of shutter blades is between the open and closed positions; and
(f) a second impact damping assembly contacting at least one shutter blade of the plurality of shutter blades at the open position and being isolated from contact with the at least one shutter blade at the closed position, the second impact damping assembly being disposed within and proximate to a perimeter of the base plate.

13. The rotary photographic shutter of claim 12, wherein the second impact damping assembly comprises a separate resilient element corresponding to each shutter blade of the plurality of shutter blades, each resilient element prohibiting a respective shutter blade of the plurality of shutter blades from traveling beyond the perimeter of the base plate in the open position.

14. The rotary photographic shutter of claim 13, wherein each resilient element comprises a foam pad.

15. The rotary photographic shutter of claim 12, wherein the second impact damping assembly prohibits the plurality of shutter blades from traveling beyond the perimeter of the base plate in the open position.

16. The rotary photographic shutter of claim 12, wherein the second impact damping assembly comprises a foam ring disposed proximate the perimeter of the base plate.

17. The rotary photographic shutter of claim 12, wherein the first impact damping assembly provides a first damping force to the drive arm, and the second damping assembly provides a second impact damping force to the at least one shutter blade less than the first damping force.

18. The rotary photographic shutter of claim 12, wherein the second impact damping assembly prohibits the at least one shutter blade from impacting the base plate at the open position.

19. The rotary photographic shutter of claim 12, wherein the second impact damping assembly is disposed between a radially inner surface of a circumferential outer wall of the base plate and the at least one shutter blade at the open position.

20. the rotary photographic shutter of claim 12, wherein the at least one shutter blade contacts a side of the damper at the open position, and wherein the side extends substantially concentric with the perimeter of the base plate.

21. A rotary photographic shutter, comprising:
(a) a base plate having a central aperture;
(b) a rotating ring;
(c) a plurality of shutter blades connected to the ring, and moveable between an open position exposing the aperture and a closed position blocking the aperture in response to rotation of the ring;
(d) a first impact damping assembly supported by the base plate, the first impact damping assembly damping the opening and closing of the plurality of shutter blades without contacting the plurality of shutter blades; and
(e) a second impact damping assembly contacting at least one shutter blade of the plurality of shutter blades at the open position and being isolated from contact with the at least one shutter blade at the closed position, the second impact damping assembly being located proximate to a perimeter of the base plate and disposed between the perimeter of the base plate and the at least one shutter blade at the open position.

22. The rotary photographic shutter of claim 21, wherein the second impact damping assembly comprises a separate resilient element corresponding to the each shutter blade of the plurality of shutter blades, each resilient element prohibiting a respective shutter blade of the plurality of shutter blades from traveling beyond a perimeter of the base plate in the open position.

23. The rotary photographic shutter of claim 22, wherein each resilient element comprises a foam pad.

24. The rotary photographic shutter of claim 21, wherein the second impact damping assembly prohibits the plurality of shutter blades from traveling beyond a perimeter of the base plate in the open position.

25. The rotary photographic shutter of claim 21, wherein the second impact damping assembly comprises a foam ring disposed proximate the perimeter of the base plate.

26. The rotary photographic shutter of claim 21, wherein the first impact damping assembly provides a first damping force to a drive arm of the shutter, the drive arm contacting the first impact damping assembly when the plurality of shutter blades reaches the open position.

27. The rotary photographic shutter of claim 26, wherein the second impact damping assembly provides a second damping force to the at least one shutter blade less than the first damping force.

28. The rotary photographic shutter of claim 21, wherein the second impact damping assembly prohibits the at least one shutter blade from impacting the base plate at the open position.

29. The rotary photographic shutter of claims 21, wherein the second impact damping assembly is disposed between a radially inner surface of a circumferential outer wall of the base plate and the at least one shutter blade at the open positions.

30. The rotary photographic shutter of claim 21, wherein the second impact damping assembly comprises a resilient element having a side extending substantially concentric with the central aperture, the at least one shutter blade contacting the side at the open position.

31. A rotary photographic shutter, comprising:
(a) a plurality of shutter blades moveable between an open position and a closed position;
(b) a first impact damping assembly operable to dampen opening and closing of the plurality of shutter blades without contacting the plurality of shutter blades; and
(c) a second impact damping assembly comprising a resilient element having a first side and a second side opposite the first side, the second side contacting the at least one shutter blade of the plurality of shutter blades at the open position and being isolated from contact with the at least one shutter blade at the closed position, the second side prohibiting the at least one shutter blade from impacting a base plate of the shutter at the open position, the first side disposed proximate a perimeter of the base plate.

32. The rotary photographic shutter of claim 31, wherein the plurality of shutter blades and a drive arm of the first impact damping assembly are mounted to a base plate.

33. The rotary photographic shutter of claim 32, wherein the second impact damping assembly comprises a separate resilient element corresponding to each shutter blade of the plurality of shutter blades, each resilient element prohibiting a respective shutter blade of the plurality of shutter blades from traveling beyond a perimeter of the base plate in the open position.

34. The rotary photographic shutter of claim 33, wherein each resilient element comprises a foam pad.

35. The rotary photographic shutter of claim 32, wherein the second impact damping assembly is disposed proximate a perimeter of the base plate, and prohibits the plurality of shutter blades from traveling beyond the perimeter of the base plate in the open position.

36. The rotary photographic shutter of claim 32, wherein the second impact damping assembly comprises a foam ring disposed proximate a perimeter of the base plate.

37. The rotary photographic shutter of claim 31, wherein the first impact damping assembly provides a first damping force to a drive arm of the shutter contacting the first impact damping assembly when the plurality of shutter blades reaches the open position.

38. The rotary photographic shutter of claim 37, wherein the second impact damping assembly provides a second damping force to the at least one shutter blade less than the first damping force.

39. The rotary photographic shutter of claim 31, wherein the first impact damping assembly comprises a damper traveling in an arcuate path between an inner bumper and an outer bumper.

40. The rotary photographic shutter of claim 39, wherein the damper is fixed to a drive arm operable to move the plurality of shutter blades between the open and closed positions without contacting the plurality of shutter blades.

41. The rotary photographic shutter of claim 31, wherein the second side extends substantially concentric with a perimeter of the base plate.

42. The rotary photographic shutter of claim 31, wherein the second side extends substantially concentric with a central aperture of the base plate.

43. A rotary photographic shutter, comprising:
(a) a base plate;
(b) a rotating ring;
(c) a plurality of shutter blades pivotally connected to the base plate, and moveable between an open position and a closed position in response to rotation of the ring;
(d) an actuation assembly connected to the base plate, the actuation assembly comprising a drive arm operable to selectively rotate the ring;
(e) a bumper assembly comprising at least one resilient element fixedly disposed with respect to the base plate, the drive arm impinging the resilient element when the plurality of shutter blades is in the open and closed positions, the drive arm being isolated from contact with the resilient element when the plurality of shutter blades is between the open and closed positions; and
(f) a damper fixedly disposed within a perimeter of the base plate such that at least one shutter blade of the plurality of shutter blades impinges the damper at the open position and is isolated from contact with the damper at the closed position, the damper prohibiting the at least one shutter blade from impacting the base plate at the open position;
wherein the damper comprises a foam ring disposed proximate the perimeter of the base plate.

* * * * *